United States Patent
Hauge

(10) Patent No.: US 12,366,088 B1
(45) Date of Patent: Jul. 22, 2025

(54) METHOD OF LATCHING FENCE SECTIONS OF A REMOVABLE MESH POOL FENCE

(71) Applicant: SUNWEST INDUSTRIES INC., Orange, CA (US)

(72) Inventor: Reed Hauge, Irvine, CA (US)

(73) Assignee: SUNWEST INDUSTRIES INC., Orange, CA (US)

( * ) Notice: Subject to any disclaimer, the term of this patent is extended or adjusted under 35 U.S.C. 154(b) by 0 days.

(21) Appl. No.: 18/420,108

(22) Filed: Jan. 23, 2024

(51) Int. Cl.
*E04H 17/16* (2006.01)
*F16B 7/04* (2006.01)

(52) U.S. Cl.
CPC ............ *E04H 17/17* (2021.01); *F16B 7/0433* (2013.01); *Y10T 29/49826* (2015.01)

(58) Field of Classification Search
CPC ................................ E04H 17/17; F16B 7/0433
See application file for complete search history.

(56) References Cited

U.S. PATENT DOCUMENTS

| | | | |
|---|---|---|---|
| 1,795,728 A * | 3/1931 | Maserang ............... | E04H 17/08 52/154 |
| 4,635,836 A * | 1/1987 | Mooney .................... | A45F 5/02 224/679 |
| 7,234,688 B1 * | 6/2007 | Asenbauer ................ | E04H 4/06 256/65.01 |
| 7,461,501 B1 * | 12/2008 | Bajema ................... | F16G 13/12 59/83 |
| 8,932,157 B2 * | 1/2015 | Wright .................... | A63C 19/08 273/390 |
| 11,028,614 B1 * | 6/2021 | Robinson ............... | A01M 29/06 |

* cited by examiner

*Primary Examiner* — Sarang Afzali
(74) *Attorney, Agent, or Firm* — DANE IP Law PC

(57) ABSTRACT

An adjustable section latch and method of using thereof is disclosed. The adjustable section latch may be used to interlock two section poles of fence sections of a removable mesh pool fence, where the aforementioned section poles are situated at a section break gap in the removable mesh pool fence. The adjustable section latch may have a bracket body with a plurality of adjusting holes on one end and a keyhole at another end. One of the adjusting holes may be used to fasten the bracket body to a first section pole, while the keyhole on the bracket body may be used to receive a screw eye fastened to a second section pole. The adjustable section latch may be used in a process of interlocking the section poles that makes such latching more convenient than conventional latching mechanisms.

9 Claims, 12 Drawing Sheets

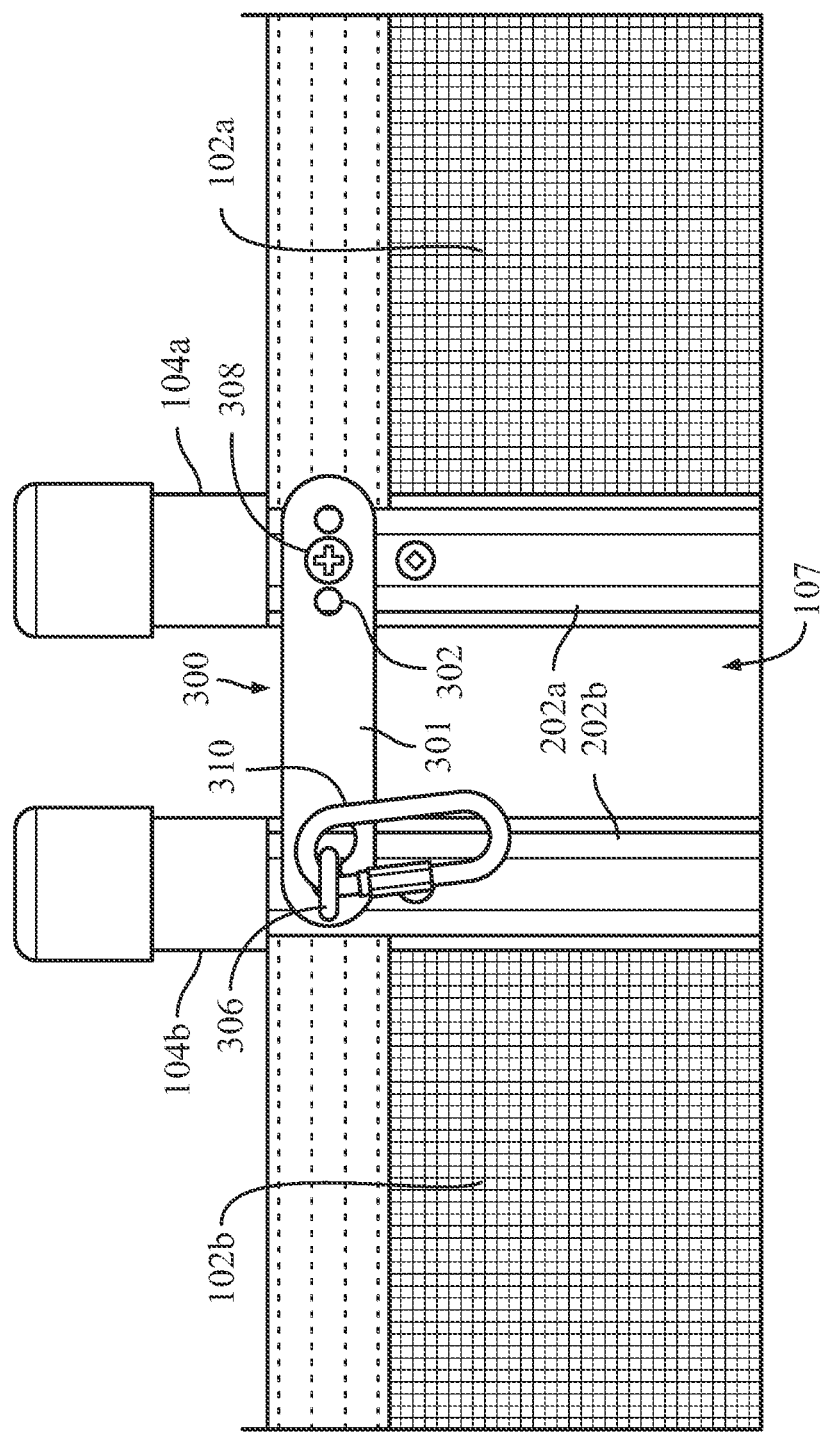

METHOD OF LATCHING FENCE SECTIONS OF A REMOVABLE MESH POOL FENCE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects and embodiments described herein relate to an adjustable section latch and method of using thereof.

Swimming pools filled with water may create a drowning hazard for children if the pool is not childproofed. Installing a removable mesh pool fence around the swimming pool may be one method used for childproofing the swimming pool. However, installing and removing the removable mesh pool fence may be difficult, especially for a layperson.

Accordingly, there is a need in the art for an improved device, system, and method for installing removable mesh pool fences.

BRIEF SUMMARY

The various embodiments and aspects disclosed herein address the needs discussed above, discussed below and those that are known in the art.

An adjustable section latch and method of using thereof is disclosed. The adjustable section latch may be used to interlock two section poles of fence sections of a removable mesh pool fence, where the aforementioned section poles are situated at a section break gap in the removable mesh pool fence. The adjustable section latch may be a solution to the limitations of conventional latching mechanisms that make removing and installing the removable mesh pool fence difficult. The simple, yet novel, design of the adjustable section latch allows a user, who may be a layperson, to latch the section poles at the section break without having to spend a great amount of time aligning and correctly pulling the section poles to create the necessary tension for the upright orientation of the meshes of the pool fence. Consequently, a user may remove and install the removable mesh pool fence more conveniently to provide a barrier that helps prevent a child from falling inside the swimming pool.

The adjustable section latch may have a bracket body with a plurality of adjusting holes on one end and a keyhole at another end. One of the adjusting holes may be used to fasten the bracket body to a first section pole, while the keyhole on the bracket body may be used to receive a screw eye fastened to a second section pole. After the screw eye clears the keyhole, a locking mechanism may be used on the ring of the screw eye to lock the bracket body and the adjustable section latch, in general, to the section poles. A plastic or rubber washer may be used between the adjusting hole and the first section pole, when fastening the bracket body, to allow the body to rotate upwards and downwards. The keyhole may have a large diameter section and a small diameter section. The keyhole may be used with various differently sized screw eyes having either a larger or smaller diameter size than the large diameter section of the keyhole. This adds to the versatility of the bracket body working with various hardware of different sizes, especially if the adjustable section latch is used as a retrofit component. The adjustable section latch may be used in a process of interlocking the section poles that makes such latching more convenient than conventional latching mechanisms.

More particularly, a method of latching fence sections divided by a section break of a removable mesh pool fence is disclosed. The method may include, mounting a first section pole of a first fence section inside a first ground hole, mounting a second section pole of a second fence section inside a second ground hole, the section break being a gap between the first section pole and the second section pole, fastening a bracket body of an adjustable section latch to a first receiving hole of the first section pole using a first adjusting hole being on the bracket body, fastening a screw eye to a second receiving hole of the second section pole, pulling the first section pole towards the second section pole such that a keyhole on the bracket body of the adjustable section latch attached to the first section pole aligns with the screw eye on the second section pole, inserting the screw eye in a large diameter portion of the keyhole on the bracket body, and releasing the first section pole and the bracket body such that the screw eye moves to a small diameter portion of the keyhole on the bracket body.

In some embodiments, the method may include using a locking mechanism on the screw eye after the screw eye moves to the small diameter portion of the keyhole on the bracket body. In some embodiments, the locking mechanism is a quick link lock. In some embodiments, the locking mechanism is a padlock. In some embodiments, the method further includes securing the quick link lock with a plier so that the quick link lock does not get undone without using a tool. In some embodiments, the method includes turning a ring of the screw eye in a vertical position after the screw eye moves to the small diameter portion of the keyhole on the bracket body.

In some embodiment, the method further includes using a plastic washer between the first adjusting hole of the bracket body and the first receiving hole of the first section pole such that the bracket body is rotatable upwards and downwards. In some embodiments, the first section pole of the first fence section is tilted at an angle away from the second section pole before the fastening of the bracket body to the first section pole. In some embodiments, the bracket body is made from aluminum and is anodized.

Furthermore, an adjustable section latch for latching fence sections of a removable mesh pool fence is disclosed. The adjustable section latch may have a bracket body having at least one adjusting hole on a first longitudinal end of the bracket body and a keyhole on a second longitudinal end of the bracket body opposite to the first longitudinal end, the keyhole having a large diameter section and a small diameter section, the large diameter section being closest to the plurality of adjusting holes, a first screw configured to traverse through one of the adjusting holes to fasten the bracket body to a first section pole of a first fence section, a washer configured to be used between the bracket body and the first section pole, and a screw eye having a ring section, the screw eye configured to fasten to a second section pole of a second fence section, the ring section of the screw eye configured to fit through the keyhole of the bracket body.

In some embodiments, the at least one adjusting hole is a plurality of adjusting holes having a first adjusting hole and a second adjusting hole. In some embodiments, a first center of the first adjusting hole has a first distance from a center of the small diameter section ranging between 2.35 to 2.90.

In some embodiments, a second center of the second adjusting hole has a second distance from the center of the small diameter section ranging between 2.00 to 2.50 inches. In some embodiments, the bracket body further has a third adjusting hole having a third center that has a third distance from the center of the small diameter section ranging between 2.70 to 3.30 inches.

In some embodiments, the large diameter section of the keyhole of the bracket body has a smaller diameter than a ring diameter of the ring section of the screw eye. In some embodiments, the large diameter section of the keyhole of the bracket body has a larger diameter than a ring diameter of the ring section of the screw eye.

In some embodiments, the adjustable section latch may have a locking mechanism configured to lock with the screw eye. In some embodiments, the locking mechanism is a quick link lock or a padlock. In some embodiments, the bracket body is made from aluminum and is anodized. In some embodiments, the bracket body has a stadium shape.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5E shows using a locking mechanism to further bind the first section pole to the second section pole using the adjustable section latch;

DETAILED DESCRIPTION

Figures 1, 2:
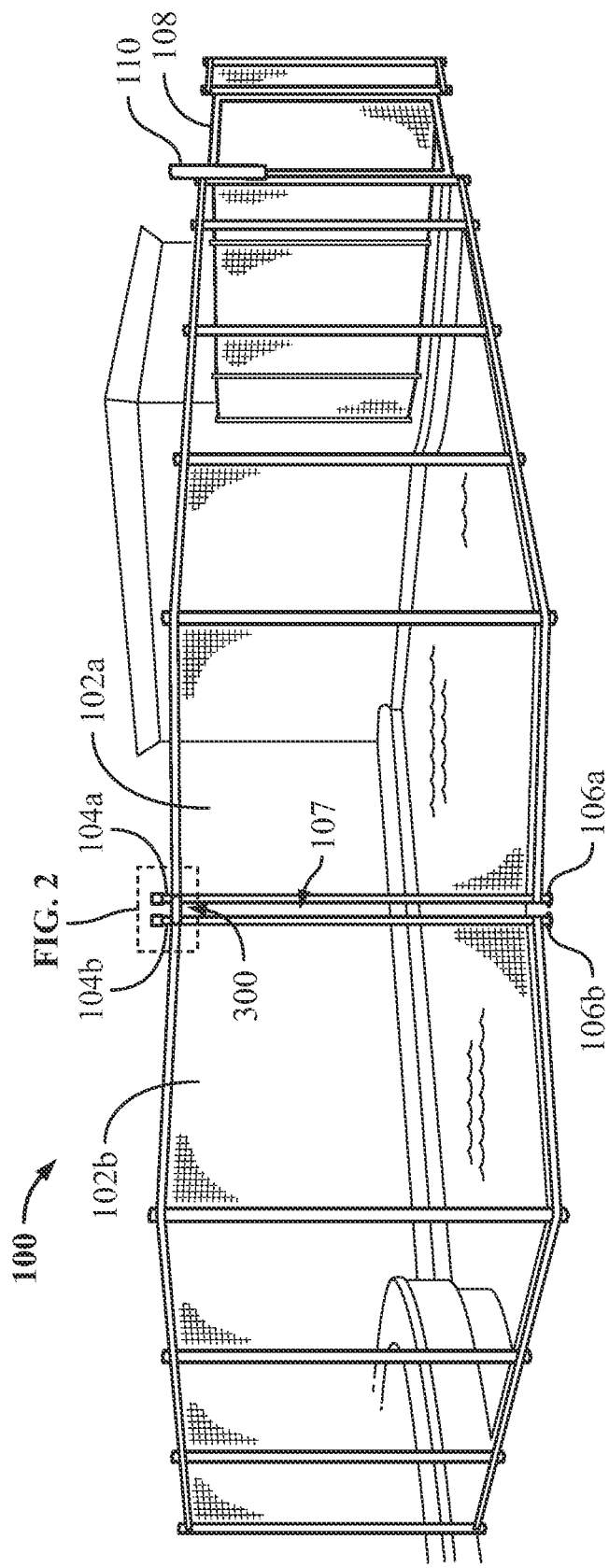
FIG. 1 shows a swimming pool surrounded by a removable mesh pool fence.
FIG. 2 shows a close-up view of a section break in the removable mesh pool fence having opposing section poles bound using an adjustable section latch.
Figure 2:
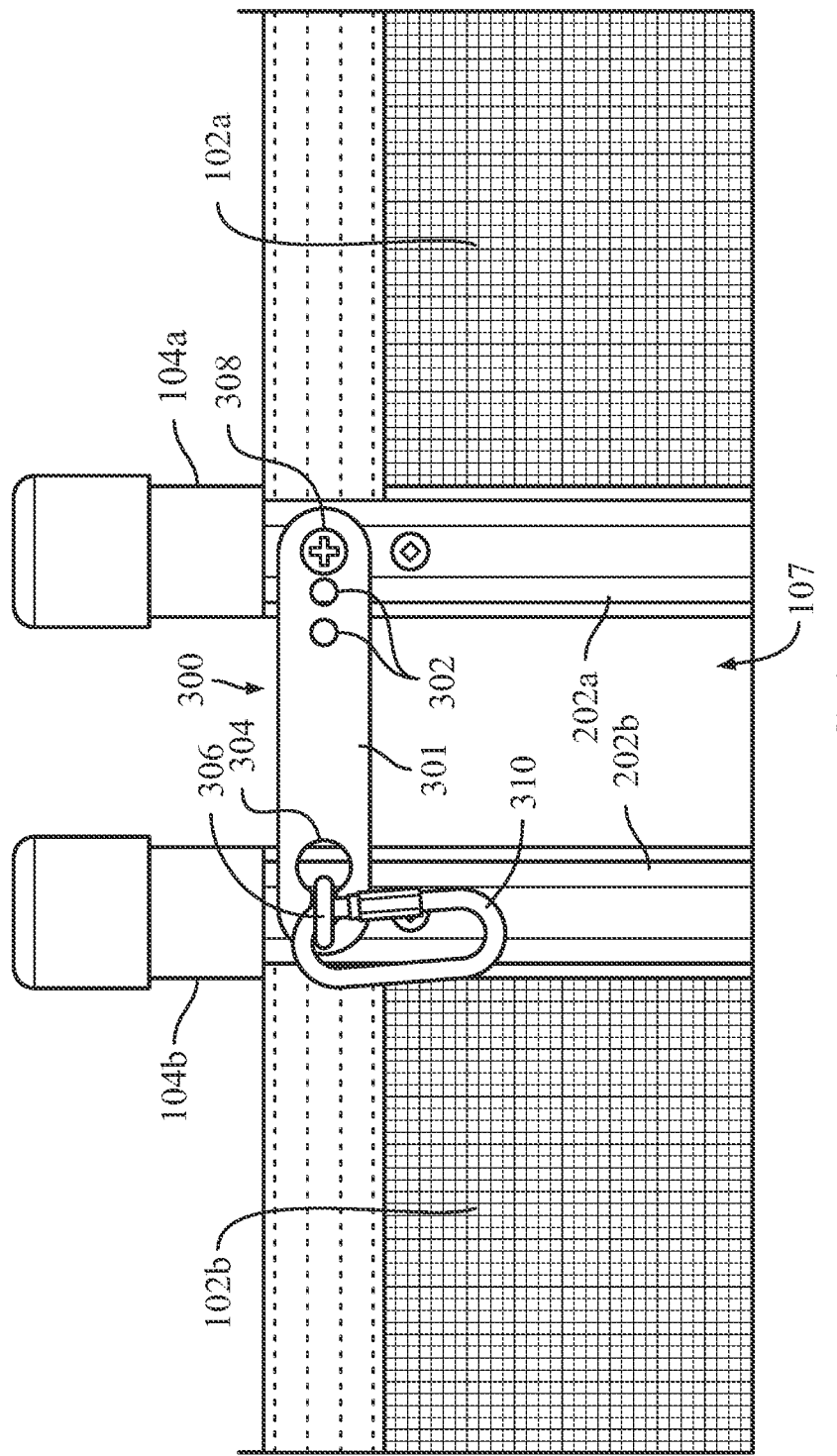
Figure 3A:
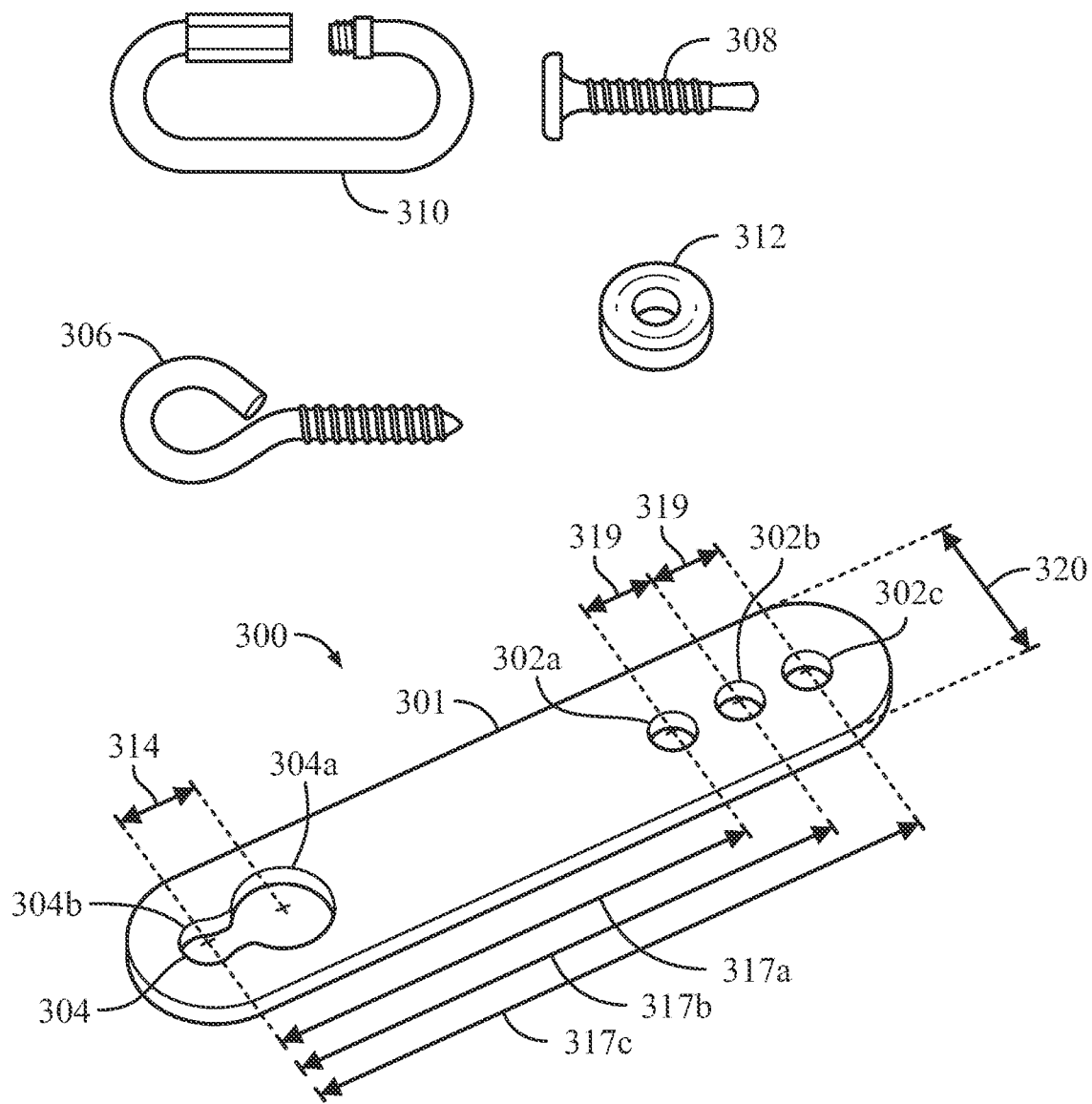
FIG. 3A shows the different components of the adjustable section latch.
Figure 3B:
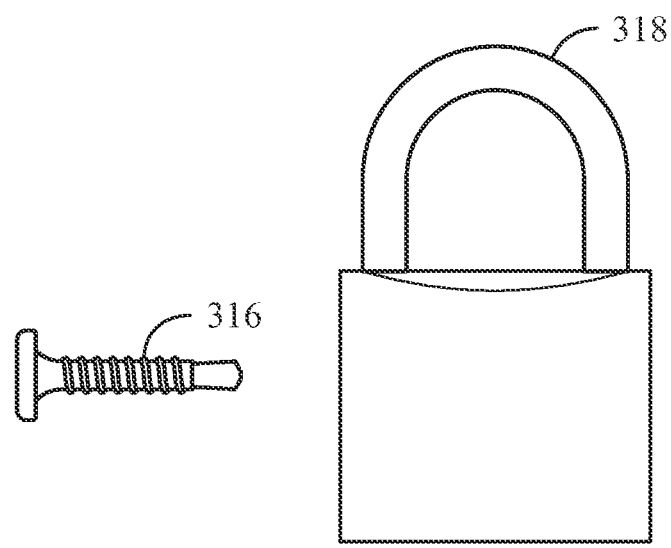
FIG. 3B shows other hardware that may be used with the adjustable section latch.
Figure 4:
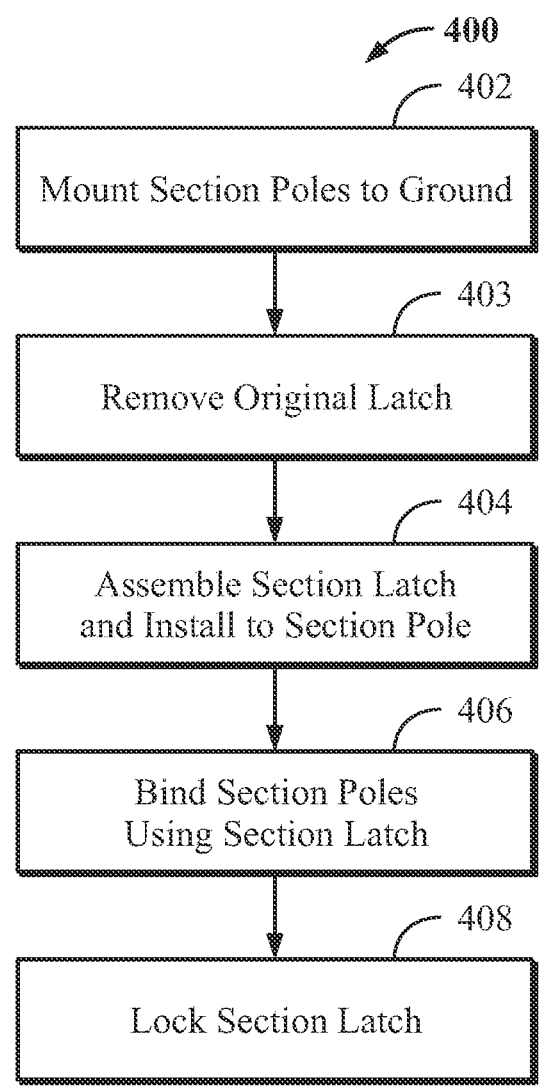
FIG. 4 shows a flow chart of a process for using the adjustable section latch when installing the removable mesh pool fence.

Referring now to the figures, an adjustable section latch 300 and a method of using thereof is disclosed. FIG. 1 shows how a removable mesh pool fence 100 may be installed around a swimming pool. The removable mesh pool fence 100 may have section poles 104a-b latched together using the adjustable section latch 300 at section break gaps 107. FIG. 2 shows a close-up view of the section break 107 of FIG. 1, in which the different structures and components of the adjustable section latch 300, and how they are connected to the fence sections 102a-b, is shown. FIGS. 3A-B show the bracket body 301 and the different hardware of the adjustable section latch 300. FIG. 4 shows a flow chart of a process 400 that may be used to utilize the adjustable section latch 300 in latching the section poles 104a-b of the fence sections 102a-b at the section break 107 shown in FIG. 1. FIGS. 5A-E show actual illustrations of the primary steps of the flow chart of FIG. 4 when using an adjustable section latch 300 in latching the section poles 104a-b at the section break 107. More particularly, in FIG. 5B, the bracket body 301 may be attached to the section pole 104a at a select hole 302 based on the distance to the eye 306. The user can squeeze the two section poles 104a, b together with one hand and user their thumb to press on the body bracket to push the key/eye 306 into the keyhole 304 by rotating the section pole with the thumb.

Referring specifically now to FIG. 1, a swimming pool surrounded by a removable mesh pool fence 100 is shown. The removable mesh pool fence 100 may be installed around a pool and be designed as a protective and cautionary mechanism to prevent a child from falling inside the pool and possibly drowning. The removable pool fence 100 may have a plurality of fence sections 102a-b made from a flexible mesh membrane that is between two section poles, with the majority of the fence sections permanently bound with each other. The removable pool fence may be installed around the pool by inserting the section poles 104a-b inside installation holes 106a-b drilled in the ground around the pool. By way of example and not limitation, the removable pool fence 100 may have a gate 108 that opens and closes to allow access to the swimming pool. By way of example and not limitation, the gate 108 may be opened and closed by latching to a section pole adjacent to the gate 108 having a gate latching mechanism 110. The removable pool fence 100 may have several section breaks 107 to compartmentalize the removable pool fence 100 into smaller segments for ease of installation and storage. However, the smaller segments of the removable pool fence 100 still need to be coupled together at the section breaks 107 by using a latching mechanism to connect section poles 104a-b of opposing fence sections 102a-b.

The correct binding of the smaller segments of the removable pool fence 100 at the section breaks 107 may be difficult for various reasons. The section poles 104a-b of the opposing fence sections 102a-b at the section break 107 need to be pulled together to be bound by the latching mechanism. However, the section poles 104a-b tend to rotate within the installation holes 106a-b on the ground in a way that the mesh 202a-b boundaries (see FIG. 2) of the opposing fence sections 102a-b move away from each other as the section poles 104a-b are pulled towards each other. By way of example and not limitation, the mesh 202a-b boundaries may be attached to the surface of the section poles 104a-b that faces the outside of the enclosure created by the removable mesh pool fence 100 (see FIG. 1). Consequently, the section poles 104a-b may not effectively be latched together using conventional latching mechanisms unless the user pulls the section poles 104a-b together in a way that the poles do not rotate and the meshes 202a-b of the opposing fence sections 102a-b come close to each other.

To add to the difficulty of latching the opposing fence sections 102a-b at the section break 107, at least one of the section poles 104a at the section break 107 may be angled 504 away from the second section pole 104b (see FIG. 5A) since the installation hole 106a (see FIG. 1) of such section pole 104a may be drilled at an angle. The slight angling of the section pole 104a may be necessary to create the upright tension for the meshes 202a-b (see FIG. 2) of the fence sections 102a-b when the section poles 104a-b are pulled and latched together. However, such angling may complicate the latching process while using a conventional latching mechanism since the user must additionally take into account moving the section pole 104a to an orthogonal orientation from the angled 504 orientation when latching the section poles 104a-b together. Additionally, conventional latching mechanisms require one hand of the user to operate the mechanical mechanism of the latching mechanism, which consequently leaves the user with only one hand to pull the section poles 104a-b effectively together.

Instead of a conventional latching mechanism, an adjustable section latch 300 (shown in FIG. 2) may be used to couple and fasten the pool fence segments at the section breaks 107 of the removable pool fence 100. The adjustable section latch 300 may have a simpler, yet novel, design than conventional latching mechanisms that add to the convenience of binding the section poles 104a-b at the section break 107. As such, the adjustable section latch 300 may allow a user, who may be a layperson, to latch the section poles 104a-b at the section break 107 without having to spend a great amount of time aligning and correctly pulling the section poles to create the necessary tension for the upright orientation of the meshes 202a-b of the pool fence 100. Consequently, a user may remove and install the removable mesh pool fence 100 more conveniently to provide a barrier that helps prevent a child from falling inside the swimming pool. By way of example and not limitation, the adjustable section latch 300 may come as part of the original pool fence kit or be used as a retrofit and substitute for the conventional latching mechanisms coming with the pool fence kit. Consequently, the adjustable section latch may utilize some of the same hardware used for conventional latching mechanisms.

As shown in FIG. 3A, and by way of example and not limitation, the adjustable section latch 300 may have a bracket body 301 that is rectangular or stadium shaped. By way of example and not limitation, the bracket body 301 may have a plurality of adjusting holes 302a-c proximate to one end of the length of the bracket body 301 and a keyhole 304 on the other end of the length of the bracket body 301. By way of example and not limitation, the bracket body 301 may be made from an aluminum or steel alloy. By way of example and not limitation, the bracket body 301 may be anodized and powdered coated as the same color as the other parts of the removable pool fence 100 (e.g., fence sections 102a-b and pole sections 104a-b) to make finding and unfastening the bracket body 301 harder for a child, which the removable pool fence 100 is designed to protect the child from falling and possibly downing in the swimming pool.

By way of example and not limitation, there may be three adjusting holes 302a-c in-line with each other along a portion of the length of the bracket body 301 on one its side and the holes may be centered along the width of the bracket body 301. The adjusting hole 302c farthest from the keyhole 403 may allow for a wider and easier connection between the section poles 104a-b of the fence sections 102a-b (see FIG. 2), and the adjusting hole 302a closest to the keyhole 304 may allow for a more sturdier and tighter connection that allows the flexible meshes 202a-b stand more upright with more tension. The center adjusting hole 302b may provide a balanced option between a convenient connection and a tight tensile force for the meshes 202a-b. The adjusting holes 302a-c may also allow for the user to customize the amount of tension (e.g., more or less tension) that would be present along the meshes 202a-b (see FIG. 2) of the removable mesh pool fence.

Figure 5A:
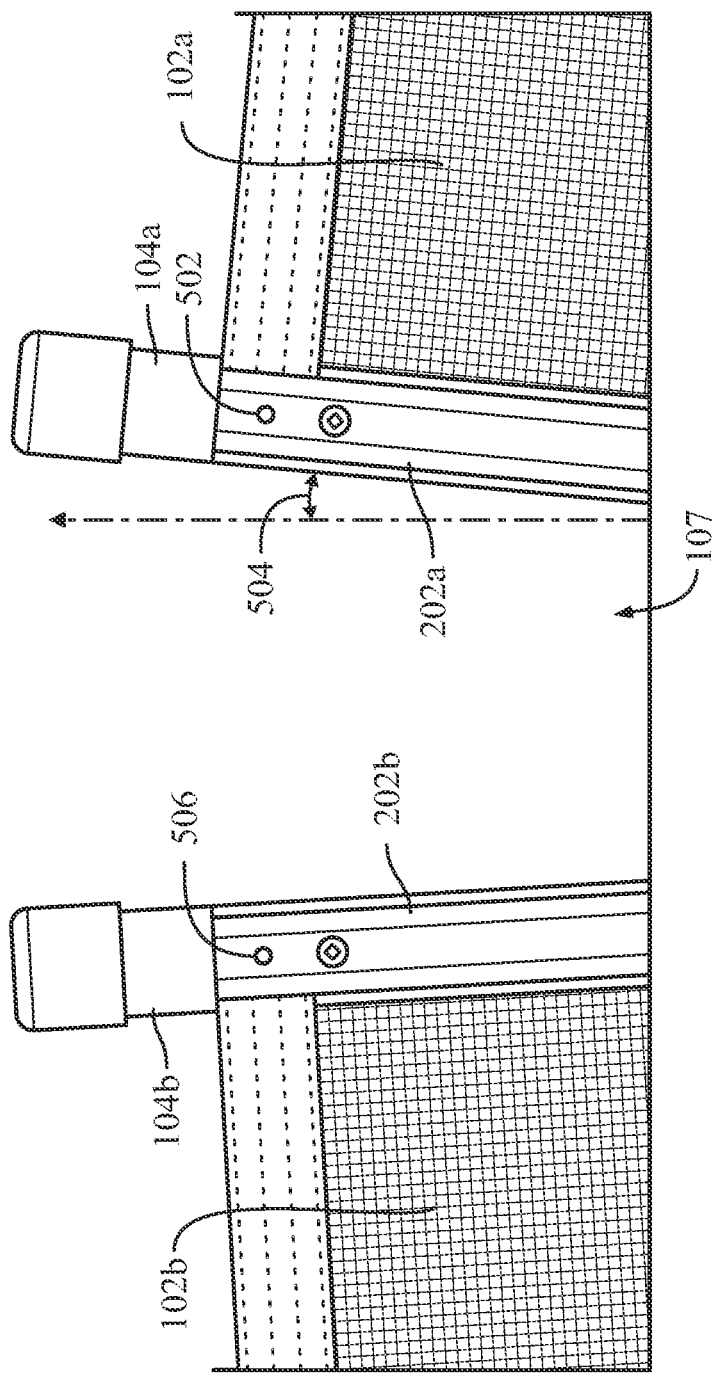
FIGS. 5A-B show the installing of the bracket body of the adjustable section latch to a first section pole of the removable mesh pool fence.

As shown in FIG. 2, and by way of example and not limitation, a screw 308 may be used to fasten the bracket body 301 to a receiving hole 502 (see FIG. 5A) of a first section pole 104a using the adjusting hole 302. This way, the bracket body 301 may be pulled with the first section pole 104a towards the second section pole 104b. By way of example and not limitation, the receiving hole 502 may penetrate through the mesh 202a boundary and the first section pole 104a of the first fence section 102a that is proximate to the section break 107. By way of example and not limitation, and as shown in FIG. 5A, the receiving hole 502 may be located on a top portion of the first section pole 104a. By way of example and not limitation, the first section pole 104a may be the pole that has a slight angle 504 in the unbound position (e.g., tilted at an angle away from the second section pole 104b).

By way of example and not limitation, on the opposite side of the stadium/rectangle of the bracket body 301, relative to the adjusting holes 302a-c (see FIG. 3A), there may exist a hole 304 having a keyhole shape. By way of example and not limitation, the keyhole 304 may have a small diameter section 304b and a large diameter section 304a creating the change in profile of the keyhole. By way of example and not limitation, the large diameter section 304a may be closest to the adjusting holes 302a-c and the small diameter section 304b may be farthest away from the adjusting holes 302a-c along the length of the bracket body 301. When the bracket body 301 is fastened to the first section pole 104a using the adjusting holes 302 (see FIG. 5B), the first section pole 104a with the bracket body 301 may be pulled towards the second section pole 104b (see FIG. 5C). By way of example and not limitation, the second section pole 104b may have a fastened screw eye 306 in a correspondingly second receiving hole 506 (see FIG. 5A) located in an opposite position relative to the receiving hole 502 of the first section pole 104a. By way of example and not limitation, the screw eye 306 may be inserted through the large diameter section 304a of the keyhole 304 and move towards the small diameter section 304b by the tensile force produced by the first section pole 104a and first fence section 102a, which interlocks the screw eye 306 and the second section pole 104b with the mounting bracket 301 (see FIG. 5D). The screw eye 306 may remain interlocked with the bracket body 301, absent an external force, since the screw eye 306 is located at the small diameter section 304b.

Figure 5B:
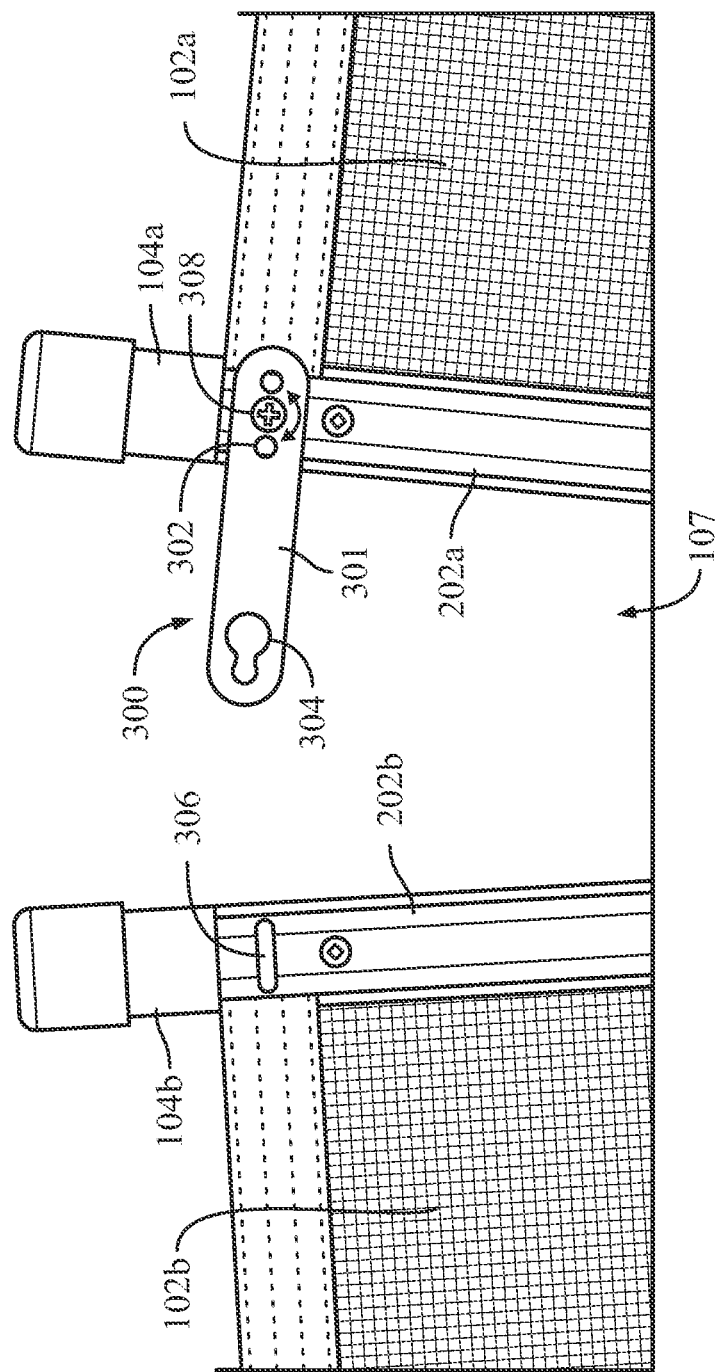
Figure 5C:
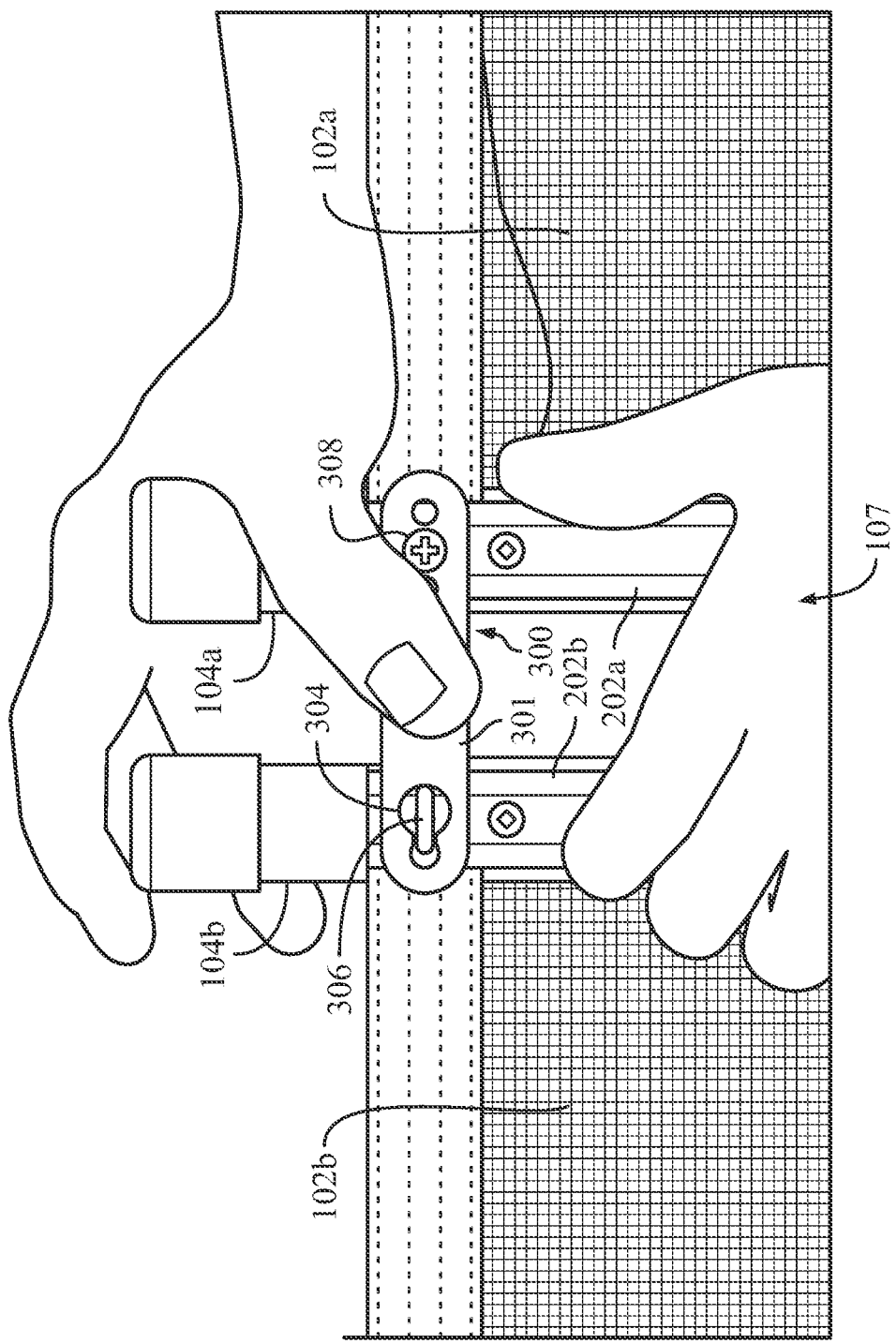
FIGS. 5C-D show the binding of the first section pole to a second section pole using the bracket body of the adjustable section latch.

By way of example and not limitation, the larger diameter section 304a (see FIG. 3A) may have a smaller diameter than a ring section of the screw eye 306 such that the ring section needs to be inserted horizontally in the keyhole 304 (see FIG. 5C). As such, the ring section of the screw eye 306 may be rotated in a vertical direction when inserted in the keyhole 304 and would remain interlocked with the bracket body 301 since the ring section has a larger diameter than the large diameter section 304a of the keyhole 304. Alternatively, the large diameter section 304a may have a larger diameter than the ring section of the screw eye 306 such that the ring section may be inserted within the large diameter section in any orientation. Consequently, the bracket body may be unlocked easier from the screw eye 306 just by moving the ring section of the screw eye 306 in the large diameter section 304a. It is contemplated herein that the keyhole 304 of the bracket body 301 may be used with various differently sized screw eyes 306 having ring sections that may have a diameter larger or smaller than the large diameter section 304a. This adds to the versatility of the bracket body 301 working with various hardware of different sizes, especially if the adjustable section latch 300 is used as a retrofit component.

By way of example and not limitation, the relative dimensions of the keyhole 304 and the adjusting holes 302a-c (see FIG. 3A) may be of importance to design a latching mechanism that may be conveniently operated while creating sufficient tensile force between the first and second section poles 104a-b for the meshes 202a-b to stand upright and tight. By way of example and not limitation, the distance 317a between the center of the adjusting hole 302a closest to the keyhole 304 and the center of the small diameter section 304b may range between 2.00 to 2.50 inches. By way of example and not limitation, the distance 317b between the center of the middle adjusting hole 302b and the center of the small diameter section 304b may range between 2.35 to 2.90 inches. By way of example and not limitation, the distance 317c between the center of the adjusting hole 302c farthest from the keyhole 304 and the center of the small diameter section 304b may range between 2.70 to 3.30 inches. By way of example and not limitation, the diameter of the adjusting holes 302a-c and the small diameter section 304b of the keyhole 304 may range between 0.192 to 0.242 inches. By way of example and not limitation, the diameter of the large diameter section 304a may range between 0.350 to 0.400 inches. By way of example and not limitation, the distance 314 between the centers of the large and small diameter sections 304a-b of the keyhole 304 may range between 0.270 to 0.320 inches. By way of example and not limitation, the distance 319 between two centers of the adjusting holes 302a-c may range between 0.35 to 0.40 inches.

By way of example and not limitation, and as shown in FIG. 3A, the bracket body 301 may have a width in the range of 0.65 and 0.85 inches. The width of the bracket body may be of importance for a compact and lightweight design of the adjustable section latch 300. By way of example and not limitation, the bracket body 301 may have a thickness in the range of 0.10 and 0.15 inches. The thickness of the bracket body 301 may be of importance so that such body is thick enough to resist bending while thin enough to allow the user to conveniently fasten the bracket body 301 to the designated section pole 104a.

Figure 6A:
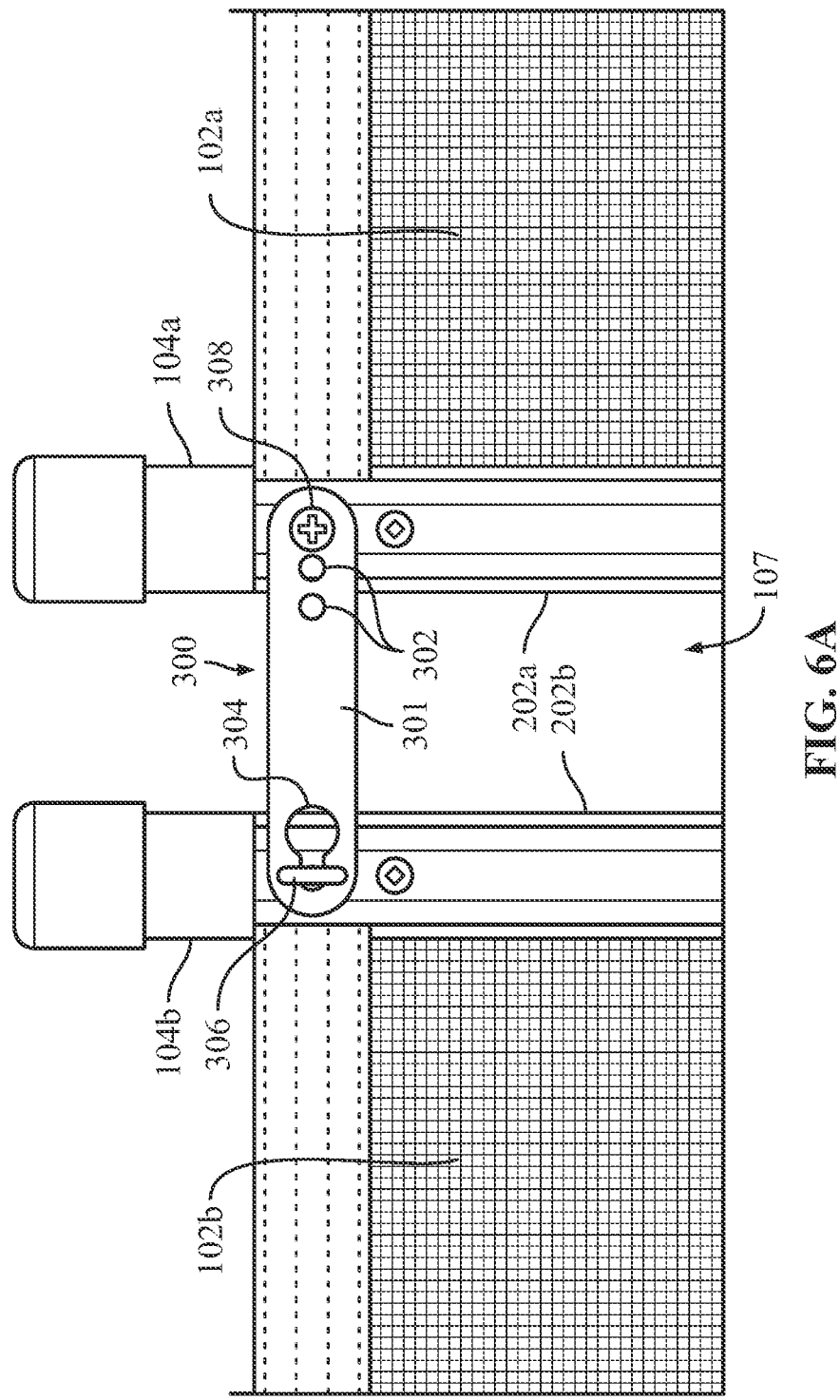
FIG. 6A shows binding the first section pole to the second section pole without using a locking mechanism.
Figure 6B:
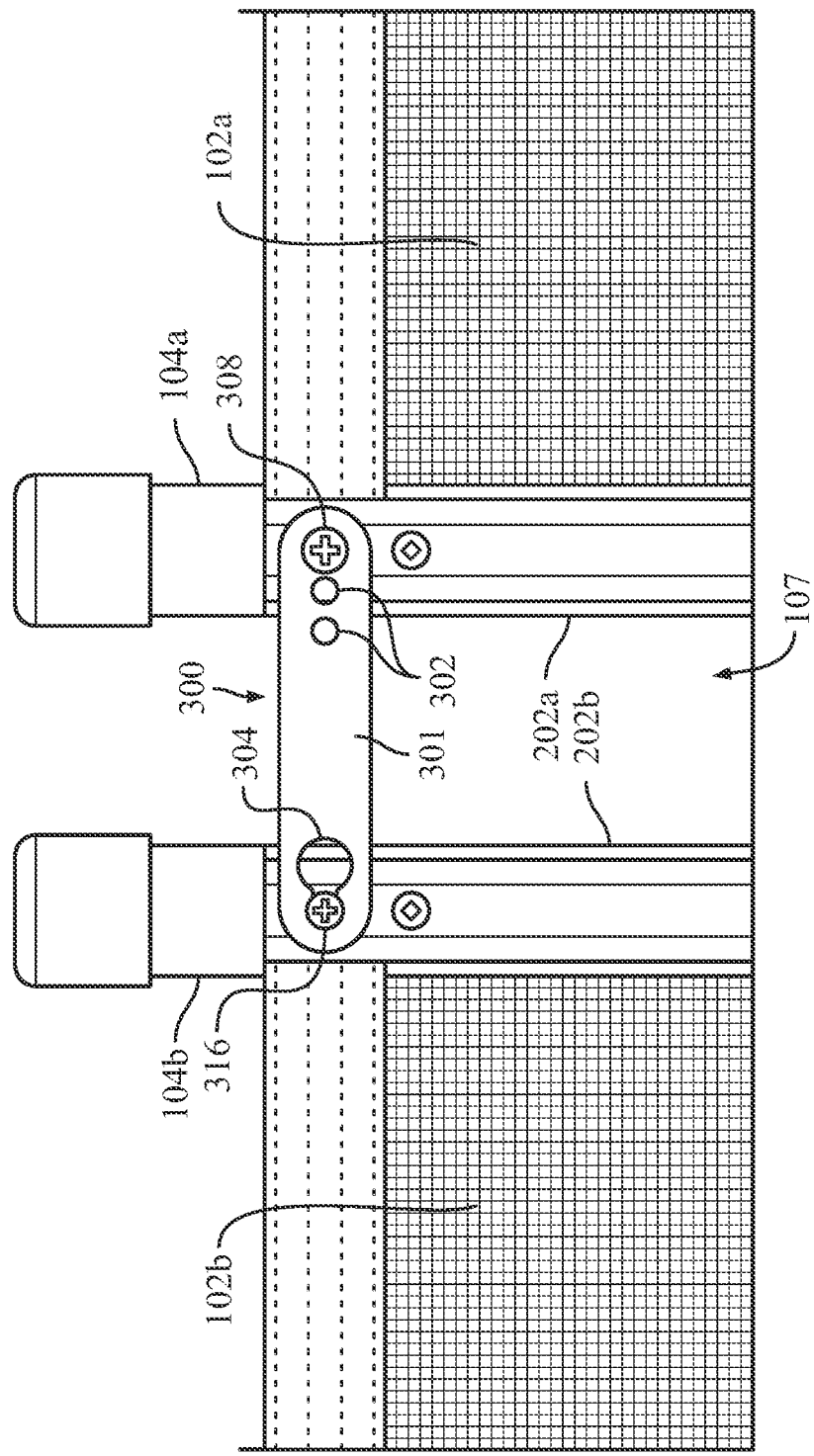
FIG. 6B shows using a screw to bind the first section pole to the second section pole using the adjustable section latch.

By way of example and not limitation, when the screw eye 306 is placed in the interlocked position in the keyhole 304 (see FIG. 5E), a locking mechanism such as a quick link 310 or a padlock 318 may be used on the ring of the screw eye 306 to lock the bracket body 301 and the adjustable section latch 300, in general, to the second section pole 104b. This may provide an additional locking layer to prevent a child from unfastening the adjustable section latch 300. By way of example and not limitation, instead of the screw eye 306 and the additional locking mechanism, a second screw 316 (see FIG. 6B) may be used with a screwdriver or a power drill to fasten the bracket body 301 to the second section pole 104b using the small diameter section 304b of the keyhole 304 and the second receiving hole 506 (see FIG. 5A) of the second section pole. Additionally, and by way of example and not limitation, a washer 312 (e.g., a plastic or rubber washer as shown in FIG. 3A) may be used between the adjusting hole 302 and the receiving hole 502 on the first section pole 104a when the first screw 308 fastens the bracket body 301 (see FIG. 5B) to the first section pole 104a to allow the bracket body 301 to rotate upwards and downwards in a folded and ready-to-use position. Alternatively, the rotatable feature may be replaced for a sturdier and more stationary fastening by using more than one adjusting hole 302 to fasten the bracket body 301 to the first section pole 104a using multiple fastening screw 308. The stationary fastening of the bracket body 301 to the first section pole 104a may also be done using only on adjusting hole 302. Washers, such as a metal washer, may also be used in stationarily fastening the bracket body 301 to the first section pole 104a.

Referring now to FIG. 4, a flow chart of a process 400 for using the adjustable section latch 300 is shown. FIGS. 5A-E show the primary steps of implementing the process 400 shown in the flow chart of FIG. 4 using the adjustable section latch 300 on opposing section poles 104a-b of fence section 102a-b that are spaced by a section break 107. The process 400 of the flow chart of FIG. 4 may make the latching of fence sections 102a-b at section breaks 107 easier because of the usage of the adjustable section latch 300, as described elsewhere herein. A user, who may be a layperson, may use the adjustable section latch 300 to latch the section poles 104a-b at the section break 107 without having to spend a great amount of time aligning and correctly pulling the section poles 104a-b to create the necessary tension for the upright orientation of the meshes 202a-b of the pool fence. Consequently, a user may remove and install the removable mesh pool fence 100 more conveniently to provide a barrier that helps prevent a child from falling inside the swimming pool.

The correct binding of the smaller segments of the removable pool fence 100 at the section breaks 107 may be difficult for various reasons. The section poles 104a-b of the opposing fence sections 102a-b at the section breaks 107 (see FIG. 5A) need to be pulled together to be bound by the latching mechanism. However, the section poles 104a-b tend to rotate within the installation holes on the ground in a way that the mesh 202a-b boundaries of the opposing fence sections 102a-b move away from each other as the section poles 104a-b are pulled towards each other. By way of example and not limitation, the mesh 202a-b boundaries may be attached to the surfaces of the section poles 104a-b that face the outside of the enclosure created by the removable mesh fence pool 100. Consequently, the section poles 104a-b may not effectively be latched together using conventional latching mechanisms unless the user pulls the section poles 104a-b together in a way that the poles do not rotate and the meshes 202a-b of the opposing fence sections 102a-b come close to each other.

To add to the difficulty of latching the opposing fence sections 102a-b at the section break 107, at least one of the section poles 104a at the section break 107 may be angled (e.g., angled away from the second section pole 104b) since the installation hole 106a (see FIG. 1) of the section pole 104a may be drilled at an angle. The slight angling 504 (see FIG. 5A) of the section pole 104a may be necessary to create the upright tensions for the meshes 202a-b of the fence section 102a-b when the section poles 104a-b are pulled and latched together. However, such angling 504 may complicate the latching process when using a conventional latching mechanism since the user must additionally take into account moving the section pole 104a to an orthogonal orientation from the angled orientation when latching the section poles 104a-b. Additionally, conventional latching mechanisms may require one hand of the user to operate the mechanical mechanism of the latching mechanism, which consequently leaves the user with only one hand to pull the section poles effectively together.

Referring back to FIG. 4, and in block 402, the process mounts the section poles 104a-b of the fence sections 102a-b to the ground (see FIG. 1) to install the removable mesh pool fence 100 around the pool. By way of example and not limitation, the section poles 104a-b of the fence sections 102a-b may be inserted in installation holes 106a-b drilled and spaced apart around the pool. There may exist section breaks 107 in the form of space gaps between some of the fence sections 102*a-b* that require the adjustable section latch 300 to be used to connect and interlock such spaced apart fence sections 102*a-b*. By way of example and not limitation, some of the ground holes 106*a-b* having the section poles 104*a-b* proximate to the section breaks 107 may be drilled at an angle for those section poles 104*a* to be initially mounted at an angle 504 away from the second section pole 104*b* (see FIG. 5A). By way of example and not limitation, the angling of at least one of the section poles 104*a* near the section break 107 may be needed so that when the section poles 104*a-b* are pulled together for latching, such pulling creates the tension that keeps the flexible meshes 202*a-b* of the fence sections 102*a-b* tight and upright.

In block 403 of the flow chart in FIG. 4, the process removes the original latching mechanism of the removable mesh pool fence 100. This step in the process may only apply if the adjustable section latch 300 is being used as a retrofit. Some of the hardware of the original latching mechanism may be used with the retrofit adjustable section latch 300.

In block 404 of the flow chart in FIG. 4, the process assembles the adjustable section latch 300 and fastens the bracket body 301 to the first section pole 104*a* (see FIG. 5B). As shown in FIGS. 5A-B, and by way of example and not limitation, a screw eye 306 of the adjustable section latch 300 may be fastened to the second receiving hole 506 of the second section pole 104*b*. As shown in FIGS. 5A-B, and by way of example and not limitation, the bracket body 301 may be rotatably or stationarily fastened to the first receiving hole 502 of the first section pole 104*a*. A first screw 308 may be used to fasten the bracket body 301 to the first receiving hole 502 of the first section pole 104*a* using one of the adjusting holes 302 on the bracket body 301. By way of example and not limitation, a plastic or rubber washer 312 (see FIG. 3A) may be used between the bracket body 301 and the first receiving hole 502 (see FIG. 5A) with the screw 308 to allow the bracket body 301 to rotate upwards and downwards in the in-use and folded position. For the bracket body 301 to be able to rotate, only one adjusting hole 302 may be used to rotatably fasten the bracket body 301 to the section pole 104*a* since an additional fastening would not allow such rotational motion. Alternatively, the rotatable feature may be replaced for a sturdier and more stationary fastening by using more than one adjusting hole 302 to fasten the bracket body 301 to the first section pole 104*a* using multiple fastening screw 308. The stationary fastening of the bracket body 301 to the first section pole 104*a* may also be done using only on adjusting hole 302. Washers, such as a metal washer, may also be used in stationarily fastening the bracket body 301 to the first section pole 104*a*.

In block 406 of FIG. 4, the process latches the first and second section poles 104*a-b* together using the adjustable section latch 300. With the bracket body 301 fastened to the first section pole 104*a* (see FIG. 5B), the bracket body 301 may be pulled with the first section pole 104*a* towards the second section pole 104*b* (see FIG. 5C), which simplifies the latching process because both the first section pole 104*a* and the bracket body 301 move similarly and simultaneously towards the second section pole 104*b*. As shown in FIG. 5C, such pulling together of the second section pole 104*b* and the first section pole 104*a* having the bracket body 301 may be done with one hand, which shows how the latching process is simplified.

As shown in FIG. 5B, and by way of example and not limitation, the ring of the screw eye 306 may be rotated horizontally (from a vertical orientation) to be able to receive the keyhole 304 of the bracket body 301. The rotation of the ring of the screw eye 306 in the horizontal direction may be especially necessary if the diameter of the large diameter section 304*a* of the keyhole 304 (see FIG. 3A) is smaller than the diameter of the ring of the screw eye 306, which a portion of the small diameter section 304*b* may be used to receive the ring of the screw eye 306, as shown in FIG. 5C. It is contemplated herein that the keyhole 304 of the bracket body 301 may be used with various differently sized screw eyes 306 having ring sections that may have a diameter larger or less than the large diameter section 304*a*. This adds to the versatility of the bracket body 301 working with various hardware of different sizes, especially if the adjustable section latch 300 is used as a retrofit component.

Figure 5D:
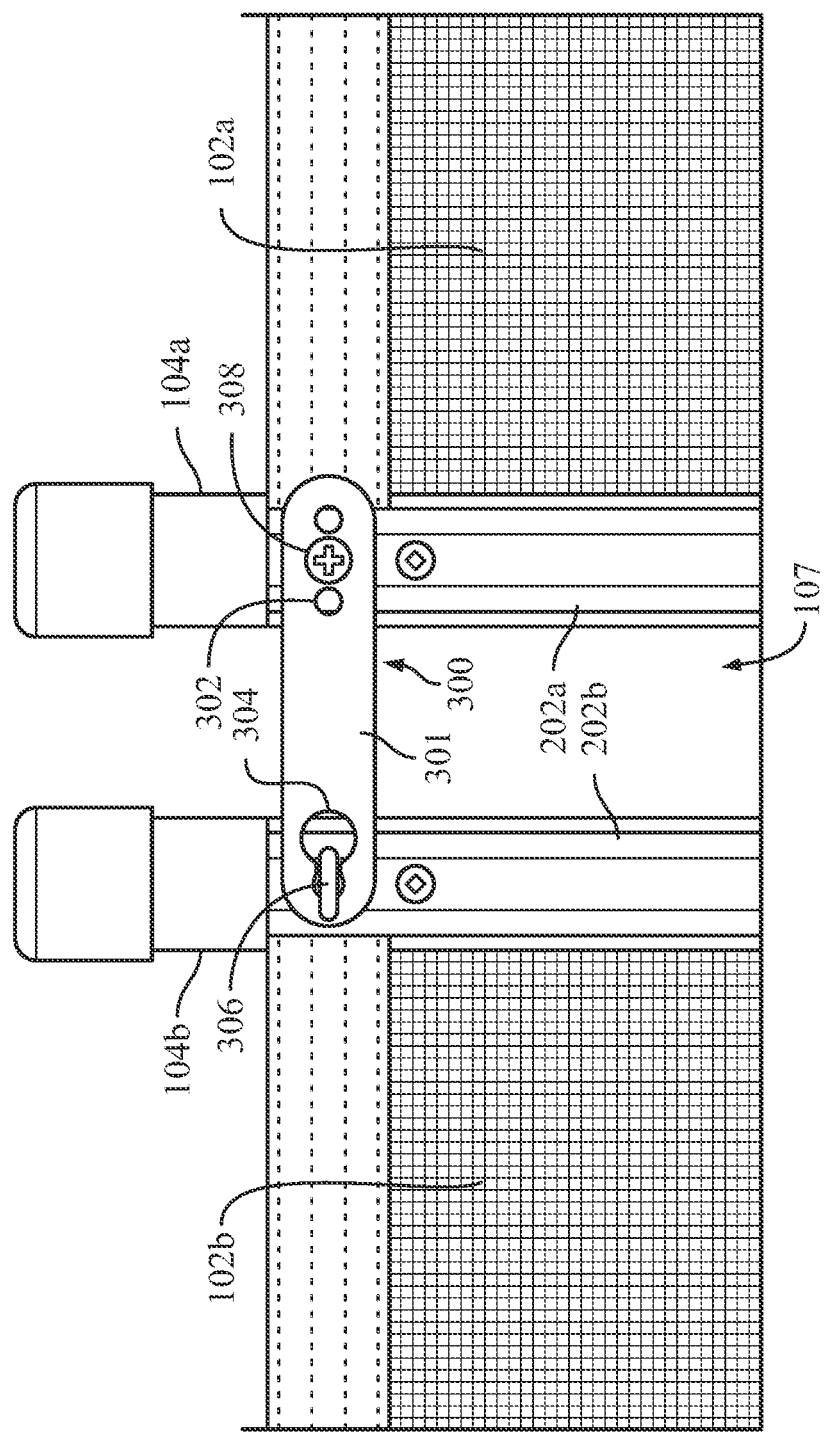

By way of example and not limitation, the first section pole 104*a* along with the rotatably or stationarily fastened bracket body 301 are pulled towards the second section pole 104*b*, and the second section pole 104*b* may be pulled towards the first section pole 104*a* having the fastened bracket body 301. A user may use one hand to pull and latch together the section poles 104*a-b* since the process is simplified by the bracket body 301 being fastened to the first section pole 104*a* and moving simultaneously and similarly towards the second section pole 104*b*, as shown in FIG. 5C. Since the bracket body 301 is fastened and moves with the first section pole 104*a*, the alignment for latching with the second section pole 104*b* is simplified. A user may have an easier time bringing the poles 104*a-b* together in such a way and to disallow the meshes 202*a*-b from rotating away from each other. By way of example and not limitation, the ring of the screw eye 306 fastened to the second section pole 104*b* may be horizontal to pass through the large diameter section 304*a* of the keyhole 304 (see FIG. 5C) and interlock with the bracket body 301. The interlocking may occur when the screw eye 306 moves towards the small diameter section 304*b* of the keyhole 304 when the section poles 104*a-b* are no longer pulled towards each other, as shown in FIG. 5D.

In block 408 of FIG. 4, the process locks the adjustable section latch 300 so that the section poles 104*a-b* are latched together. As shown in FIG. 5E, and by way of example and not limitation, a quick link 310 locking mechanism may be used on the ring of the screw eye 306 as the additional locking mechanism. Industry standards may require a tool to be used in locking the latching mechanism for further childproofing the fence as permanent locking. Consequently, a plier may be used to further tighten and fasten the quick link 310 to meet industry standards. As such, the quick link 310 lock may not get undone without using a tool, such as a plier. Alternatively, a padlock 318 (see FIG. 3B) may be used as the locking mechanism, where the tool to be used in the locking mechanism is the padlock key. Alternatively, meeting industry standards may not always be necessary. Consequently, the screw eye 306 may simply be turned vertically instead (FIG. 6A) to prevent the latching mechanism from getting undone while providing a convenient way to lock the section poles 104*a-b* together. The turning of the screw eye 306 in the vertical direction may be an effective interlocking mechanism, especially if the ring of the screw eye 306 is larger than the large diameter section of the keyhole 304. Consequently, the interlocking may not get undone even if the screw eye 306 is moved in the large diameter section when the ring is in a vertical orientation.

Instead of using a screw eye 306, and by way of example and not limitation, a second screw 316 may be used (see FIG. 6B) to fasten the bracket body 301 to the second section pole 104*b* using the small diameter section 304*b* of the keyhole 403. The bracket body 301 on the first section pole 104a may be pulled towards the second section pole 104b such that the small diameter section 304b of the keyhole 304 is aligned with the second receiving hole 506 of the second section pole 104b. Then, a screwdriver or a power tool (e.g., power drill) may be used to fasten the bracket body 301 to the second pole section 104b using the second screw 316 and the small diameter section 304b of the keyhole 304. The aforementioned type of fastening may also meet industry standards for permanent locking since a tool is being used to lock the latching mechanism.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of latching fence sections divided by a section break of a removable mesh pool fence, the method comprising:
    mounting a first section pole of a first fence section inside a first ground hole;
    mounting a second section pole of a second fence section inside a second ground hole, the section break being a gap between the first section pole and the second section pole;
    fastening a bracket body of an adjustable section latch to a first receiving hole of the first section pole using a first adjusting hole being on the bracket body;
    fastening a screw eye to a second receiving hole of the second section pole;
    gripping the first section pole and the second section pole towards each other such that a keyhole on the bracket body of the adjustable section latch attached to the first section pole aligns with the screw eye on the second section pole, wherein the keyhole defines a small portion and a separate large portion immediately adjacent to one side of the small portion, the large portion interposed between the small portion and the first adjusting hole of the bracket body;
    inserting the screw eye in the large portion of the keyhole on the bracket body;
    releasing the first section pole and the bracket body such that a shaft of the screw eye moves from the large portion and out of the large portion completely to the small portion of the keyhole on the bracket body by a tensile force produced by the first section pole and the first fence section; and
    retaining the screw eye within the keyhole.

2. The method of claim 1, further comprising using a locking mechanism on the screw eye after the screw eye moves to the small portion of the keyhole on the bracket body.

3. The method of claim 2, wherein the locking mechanism is a quick link lock.

4. The method of claim 3, further comprising securing the quick link lock with a plier so that the quick link lock does not get undone without using a tool.

5. The method of claim 2, wherein the locking mechanism is a padlock.

6. The method of claim 1, further comprising turning a ring of the screw eye in a vertical position after the screw eye moves to the small portion of the keyhole on the bracket body.

7. The method of claim 1, further comprising using a plastic washer between the first adjusting hole of the bracket body and the first receiving hole of the first section pole such that the bracket body is rotatable upwards and downwards.

8. The method of claim 1, wherein the first section pole of the first fence section is tilted at an angle away from the second section pole before the fastening of the bracket body to the first section pole.

9. The method of claim 1, wherein the bracket body is made from aluminum and is anodized.

\* \* \* \* \*